(12) United States Patent  (10) Patent No.: US 7,744,760 B2
Wilkins et al.  (45) Date of Patent: Jun. 29, 2010

(54) METHOD AND APPARATUS FOR DESALINATION

(75) Inventors: Frederick C. Wilkins, Pepperell, MA (US); Anil D. Jha, Lincoln, MA (US); Gary C. Ganzi, Lexington, MA (US)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 11/524,080

(22) Filed: Sep. 20, 2006

(65) Prior Publication Data

US 2008/0067125 A1 Mar. 20, 2008

(51) Int. Cl.
*B01D 61/00* (2006.01)
*B01D 61/42* (2006.01)

(52) U.S. Cl. ................. 210/652; 210/257.2; 210/195.2; 204/259; 204/518; 204/627; 204/510; 204/524

(58) Field of Classification Search ................. 210/652, 210/257.2, 195.2, 767, 663; 204/259, 518, 204/627
See application file for complete search history.

(56) References Cited

U.S. PATENT DOCUMENTS

| | | |
|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,639,231 A * | 2/1972 | Bresler ........................ 210/638 |
| 3,645,884 A | 2/1972 | Gilliland |

(Continued)

FOREIGN PATENT DOCUMENTS

AU  B-18629/92  10/1992

(Continued)

OTHER PUBLICATIONS

Chemical Processing, Family of High Temperature RO Membrane Elements, Product News, p. 1. Aug. 15, 2002.

(Continued)

*Primary Examiner*—Ana M Fortuna

(57) ABSTRACT

A method and apparatus for purifying water are provided. A feed water such as seawater can be fed to a filter such as a nanofiltration membrane to produce a permeate that can, in turn, be fed to an electrodeionization system to produce fresh water.

7 Claims, 2 Drawing Sheets

U.S. PATENT DOCUMENTS

| | | | |
|---|---|---|---|
| 3,686,089 A | 8/1972 | Korngold | |
| 3,755,135 A | 8/1973 | Johnson | |
| 3,869,375 A | 3/1975 | Ono et al. | |
| 3,869,376 A | 3/1975 | Tejeda | |
| 3,870,033 A | 3/1975 | Faylor et al. | |
| 3,876,565 A | 4/1975 | Takashima et al. | |
| 3,989,615 A | 11/1976 | Kiga et al. | |
| 4,032,452 A | 6/1977 | Davis | |
| 4,033,850 A | 7/1977 | Kedem et al. | |
| 4,089,758 A | 5/1978 | McAloon | |
| 4,116,889 A | 9/1978 | Chlanda et al. | |
| 4,119,581 A | 10/1978 | Rembaum et al. | |
| 4,130,473 A | 12/1978 | Eddleman | |
| 4,153,761 A | 5/1979 | Marsh | |
| 4,167,551 A | 9/1979 | Tamura et al. | |
| 4,191,811 A | 3/1980 | Hodgdon | |
| 4,197,206 A | 4/1980 | Karn | |
| 4,216,073 A | 8/1980 | Goldstein | |
| 4,217,200 A | 8/1980 | Kedem et al. | |
| 4,226,688 A | 10/1980 | Kedem et al. | |
| 4,228,000 A | 10/1980 | Hoeschler | |
| 4,294,933 A | 10/1981 | Kihara et al. | |
| 4,298,442 A | 11/1981 | Giuffrida | |
| 4,321,145 A | 3/1982 | Carlson | |
| 4,330,654 A | 5/1982 | Ezzell et al. | |
| 4,342,651 A | 8/1982 | Ahrens | |
| 4,358,545 A | 11/1982 | Ezzell et al. | |
| 4,374,232 A | 2/1983 | Davis | |
| 4,430,226 A | 2/1984 | Hedge et al. | |
| 4,465,573 A | 8/1984 | O'Hare | |
| 4,473,450 A | 9/1984 | Nayak et al. | |
| 4,505,797 A | 3/1985 | Hodgdon et al. | |
| 4,574,049 A | 3/1986 | Pittner | |
| 4,599,178 A * | 7/1986 | Blytas | 210/737 |
| 4,610,790 A | 9/1986 | Reti et al. | |
| 4,614,576 A | 9/1986 | Goldstein | |
| 4,632,745 A | 12/1986 | Giuffrida et al. | |
| 4,636,296 A | 1/1987 | Kunz | |
| 4,655,909 A | 4/1987 | Furuno et al. | |
| 4,661,411 A | 4/1987 | Martin et al. | |
| 4,671,863 A | 6/1987 | Tejeda | |
| 4,687,561 A | 8/1987 | Kunz | |
| 4,702,810 A | 10/1987 | Kunz | |
| 4,707,240 A | 11/1987 | Parsi et al. | |
| 4,747,929 A | 5/1988 | Siu et al. | |
| 4,747,955 A | 5/1988 | Kunin | |
| 4,751,153 A | 6/1988 | Roth | |
| 4,753,681 A | 6/1988 | Giuffrida et al. | |
| 4,770,793 A | 9/1988 | Treffry-Goatley et al. | |
| 4,775,480 A * | 10/1988 | Milton et al. | 210/652 |
| 4,804,451 A | 2/1989 | Palmer | |
| 4,808,287 A * | 2/1989 | Hark | 210/637 |
| 4,849,102 A | 7/1989 | Latour et al. | |
| 4,871,431 A | 10/1989 | Parsi | |
| 4,872,958 A | 10/1989 | Suzuki et al. | |
| 4,880,511 A * | 11/1989 | Sugita | 210/655 |
| 4,915,803 A | 4/1990 | Morris | |
| 4,925,541 A | 5/1990 | Giuffrida et al. | |
| 4,931,160 A | 6/1990 | Giuffrida | |
| 4,956,071 A | 9/1990 | Giuffrida et al. | |
| 4,964,970 A | 10/1990 | O'Hare | |
| 4,969,983 A | 11/1990 | Parsi | |
| 4,983,267 A | 1/1991 | Moeglich et al. | |
| 5,026,465 A | 6/1991 | Katz et al. | |
| 5,030,672 A | 7/1991 | Hann et al. | |
| 5,032,265 A | 7/1991 | Jha et al. | |
| 5,066,375 A | 11/1991 | Parsi et al. | |
| 5,066,402 A | 11/1991 | Anselme et al. | |
| 5,073,268 A | 12/1991 | Saito et al. | |
| 5,082,472 A | 1/1992 | Mallouk et al. | |
| 5,084,148 A | 1/1992 | Kazcur et al. | |
| 5,092,970 A | 3/1992 | Kaczur et al. | |
| 5,106,465 A | 4/1992 | Kaczur et al. | |
| 5,116,509 A | 5/1992 | White | |
| 5,120,416 A | 6/1992 | Parsi et al. | |
| 5,126,026 A | 6/1992 | Chlanda | |
| 5,128,043 A | 7/1992 | Wildermuth | |
| 5,154,809 A | 10/1992 | Oren et al. | |
| 5,166,220 A | 11/1992 | McMahon | |
| 5,176,828 A | 1/1993 | Proulx | |
| 5,192,432 A | 3/1993 | Andelman | |
| 5,196,115 A | 3/1993 | Andelman | |
| 5,203,976 A | 4/1993 | Parsi et al. | |
| 5,211,823 A | 5/1993 | Giuffrida et al. | |
| 5,223,103 A | 6/1993 | Kazcur et al. | |
| H1206 H | 7/1993 | Thibodeaux et al. | |
| 5,240,579 A | 8/1993 | Kedem | |
| 5,244,579 A | 9/1993 | Horner et al. | |
| 5,254,227 A | 10/1993 | Cawlfield et al. | |
| 5,254,257 A * | 10/1993 | Brigano et al. | 210/639 |
| 5,259,936 A | 11/1993 | Ganzi | |
| 5,292,422 A | 3/1994 | Liang et al. | |
| 5,308,466 A | 5/1994 | Ganzi et al. | |
| 5,308,467 A | 5/1994 | Sugo et al. | |
| 5,316,637 A * | 5/1994 | Ganzi et al. | 204/533 |
| 5,342,521 A | 8/1994 | Bardot et al. | |
| 5,346,624 A | 9/1994 | Libutti et al. | |
| 5,346,924 A | 9/1994 | Giuffrida | |
| 5,356,849 A | 10/1994 | Matviya et al. | |
| 5,358,640 A | 10/1994 | Zeiher et al. | |
| 5,376,253 A | 12/1994 | Rychen et al. | |
| 5,397,445 A | 3/1995 | Umemura et al. | |
| 5,411,641 A | 5/1995 | Trainham, III et al. | |
| 5,415,786 A | 5/1995 | Martin et al. | |
| 5,423,965 A | 6/1995 | Kunz | |
| 5,425,858 A | 6/1995 | Farmer | |
| 5,425,866 A | 6/1995 | Sugo et al. | |
| 5,434,020 A | 7/1995 | Cooper | |
| 5,444,031 A | 8/1995 | Hayden | |
| 5,451,309 A | 9/1995 | Bell | |
| 5,458,781 A * | 10/1995 | Lin | 210/651 |
| 5,458,787 A | 10/1995 | Rosin et al. | |
| 5,460,725 A | 10/1995 | Stringfield | |
| 5,460,728 A | 10/1995 | Klomp et al. | |
| 5,489,370 A | 2/1996 | Lomasney et al. | |
| 5,503,729 A * | 4/1996 | Elyanow et al. | 204/630 |
| 5,518,626 A | 5/1996 | Birbara et al. | |
| 5,518,627 A | 5/1996 | Tomoi et al. | |
| 5,536,387 A | 7/1996 | Hill et al. | |
| 5,538,611 A | 7/1996 | Otowa | |
| 5,538,655 A | 7/1996 | Fauteux et al. | |
| 5,539,002 A | 7/1996 | Watanabe | |
| 5,547,551 A | 8/1996 | Bahar et al. | |
| 5,558,753 A | 9/1996 | Gallagher et al. | |
| 5,580,437 A | 12/1996 | Trainham, III et al. | |
| 5,584,981 A | 12/1996 | Turner et al. | |
| 5,593,563 A | 1/1997 | Denoncourt et al. | |
| 5,599,614 A | 2/1997 | Bahar et al. | |
| 5,635,071 A * | 6/1997 | Al-Samadi | 210/652 |
| 5,670,053 A | 9/1997 | Collentro et al. | |
| 5,679,228 A | 10/1997 | Elyanow et al. | |
| 5,679,229 A | 10/1997 | Goldstein et al. | |
| 5,714,521 A | 2/1998 | Kedem et al. | |
| 5,716,531 A | 2/1998 | Kenley et al. | |
| RE35,741 E | 3/1998 | Oren et al. | |
| 5,733,602 A | 3/1998 | Hirose et al. | |
| 5,736,023 A | 4/1998 | Gallagher et al. | |
| 5,759,373 A | 6/1998 | Terada et al. | |
| 5,762,421 A | 6/1998 | Ross | |
| 5,762,774 A | 6/1998 | Tessier | |
| 5,766,479 A | 6/1998 | Collentro et al. | |
| 5,788,826 A | 8/1998 | Nyberg | |
| 5,804,055 A | 9/1998 | Coin et al. | |
| 5,814,197 A | 9/1998 | Batchelder et al. | |

| | | | | | | |
|---|---|---|---|---|---|---|
| 5,837,124 | A | 11/1998 | Su et al. | 7,122,149 | B2 | 10/2006 | Li et al. |
| 5,858,191 | A | 1/1999 | DiMascio et al. | 7,144,511 | B2 * | 12/2006 | Vuong ........................ 210/652 |
| 5,868,915 | A | 2/1999 | Ganzi et al. | 7,147,785 | B2 | 12/2006 | Arba et al. |
| 5,891,328 | A | 4/1999 | Goldstein | 7,306,724 | B2 * | 12/2007 | Gordon ...................... 210/241 |
| 5,925,240 | A | 7/1999 | Wilkins et al. | 7,459,088 | B2 * | 12/2008 | Davis ........................ 210/702 |
| 5,925,255 | A * | 7/1999 | Mukhopadhyay ............ 210/652 | 7,470,366 | B2 * | 12/2008 | Queen et al. ................ 210/259 |
| 5,928,807 | A | 7/1999 | Elias | 7,563,351 | B2 * | 7/2009 | Wilkins et al. .............. 204/524 |
| 5,944,999 | A * | 8/1999 | Chancellor et al. .......... 210/650 | 2001/0003329 | A1 | 6/2001 | Sugaya et al. |
| 5,954,935 | A | 9/1999 | Neumeister et al. | 2002/0092769 | A1 | 7/2002 | Garcia et al. |
| 5,961,805 | A | 10/1999 | Terada et al. | 2002/0104804 | A1 | 8/2002 | Grott |
| 5,980,716 | A | 11/1999 | Horinouchi et al. | 2002/0144948 | A1 | 10/2002 | Aimar et al. |
| 6,030,535 | A | 2/2000 | Hayashi et al. | 2002/0144954 | A1 | 10/2002 | Arba et al. |
| 6,056,878 | A * | 5/2000 | Tessier et al. ................ 210/639 | 2003/0080467 | A1 | 5/2003 | Andrews et al. |
| 6,099,716 | A | 8/2000 | Molter et al. | 2003/0089609 | A1 | 5/2003 | Liang et al. |
| 6,103,125 | A | 8/2000 | Kuepper | 2003/0098266 | A1 | 5/2003 | Shiue et al. |
| 6,113,797 | A * | 9/2000 | Al-Samadi .................. 210/652 | 2003/0155243 | A1 | 8/2003 | Sferrazza |
| 6,126,834 | A | 10/2000 | Tonelli et al. | 2003/0201235 | A1 | 10/2003 | Chidambaran et al. |
| RE36,972 | E | 11/2000 | Baker et al. | 2003/0205526 | A1 | 11/2003 | Vuong |
| 6,146,524 | A | 11/2000 | Story | 2004/0035802 | A1 | 2/2004 | Emery et al. |
| 6,149,788 | A | 11/2000 | Tessier et al. | 2004/0055955 | A1 | 3/2004 | Davis |
| 6,171,374 | B1 | 1/2001 | Barton et al. | 2004/0079700 | A1 | 4/2004 | Wood et al. |
| 6,187,154 | B1 | 2/2001 | Yamaguchi et al. | 2005/0016932 | A1 | 1/2005 | Arba et al. |
| 6,187,162 | B1 | 2/2001 | Mir | 2005/0103622 | A1 | 5/2005 | Jha et al. |
| 6,190,528 | B1 | 2/2001 | Li et al. | 2005/0103630 | A1 | 5/2005 | Ganzi et al. |
| 6,190,558 | B1 | 2/2001 | Robbins | 2005/0103631 | A1 | 5/2005 | Freydina et al. |
| 6,193,869 | B1 | 2/2001 | Towe et al. | 2005/0103644 | A1 | 5/2005 | Wilkins et al. |
| 6,197,174 | B1 | 3/2001 | Barber et al. | 2005/0103717 | A1 | 5/2005 | Jha et al. |
| 6,197,189 | B1 | 3/2001 | Schwartz et al. | 2005/0103722 | A1 | 5/2005 | Freydina et al. |
| 6,214,204 | B1 | 4/2001 | Gadkaree et al. | 2005/0103723 | A1 | 5/2005 | Wilkins et al. |
| 6,228,240 | B1 | 5/2001 | Terada et al. | 2005/0103724 | A1 | 5/2005 | Wilkins et al. |
| 6,235,166 | B1 | 5/2001 | Towe et al. | 2005/0109703 | A1 | 5/2005 | Newenhizen |
| 6,248,226 | B1 | 6/2001 | Shinmei et al. | 2005/0121388 | A1 | 6/2005 | Wood et al. |
| 6,254,741 | B1 | 7/2001 | Stuart et al. | 2005/0247631 | A1 * | 11/2005 | Queen et al. ................ 210/652 |
| 6,258,278 | B1 | 7/2001 | Tonelli et al. | 2005/0263457 | A1 | 12/2005 | Wilkins et al. |
| 6,267,891 | B1 | 7/2001 | Tonelli et al. | 2006/0091077 | A1 | 5/2006 | Haas et al. |
| 6,274,019 | B1 | 8/2001 | Kuwata | 2007/0284251 | A1 | 12/2007 | Zuback et al. |
| 6,279,019 | B1 | 8/2001 | Oh et al. | | | | |
| 6,284,124 | B1 | 9/2001 | DiMascio et al. | | | FOREIGN PATENT DOCUMENTS | |
| 6,284,399 | B1 | 9/2001 | Oko et al. | | | | |
| 6,296,751 | B1 | 10/2001 | Mir | CA | | 2316012 | 11/2001 |
| 6,303,037 | B1 | 10/2001 | Tamura et al. | CN | | 1044411 A | 8/1990 |
| 6,334,955 | B1 | 1/2002 | Kawashima et al. | DE | | 1 201 055 | 9/1965 |
| 6,365,023 | B1 | 4/2002 | De Los Reyes et al. | DE | | 2708240 | 8/1978 |
| 6,375,812 | B1 | 4/2002 | Leonida | DE | | 3238280 | 4/1984 |
| 6,379,518 | B1 * | 4/2002 | Osawa et al. ................ 204/524 | DE | | 4016000 | 11/1991 |
| 6,391,178 | B1 | 5/2002 | Garcia et al. | DE | | 4238532 | 11/1992 |
| 6,402,916 | B1 | 6/2002 | Sampson et al. | DE | | 44 18 812 | 12/1995 |
| 6,402,917 | B1 | 6/2002 | Emery et al. | DE | | 199 42 347 | 3/2001 |
| 6,461,512 | B1 | 10/2002 | Hirayama et al. | EP | | 0170895 | 3/1989 |
| 6,468,430 | B1 | 10/2002 | Kimura et al. | EP | | 0 462 606 | 12/1991 |
| 6,471,853 | B1 | 10/2002 | Moscaritolo | EP | | 0 503 589 | 9/1992 |
| 6,482,304 | B1 | 11/2002 | Emery et al. | EP | | 0 680 932 | 11/1995 |
| 6,485,649 | B1 | 11/2002 | Terava et al. | EP | | 0 621 072 A2 | 3/1997 |
| 6,495,014 | B1 | 12/2002 | Datta et al. | EP | | 0803474 | 10/1997 |
| 6,508,936 | B1 | 1/2003 | Hassan | EP | | 0 870 533 | 10/1998 |
| 6,537,456 | B2 * | 3/2003 | Mukhopadhyay ............ 210/652 | EP | | 1 068 901 | 1/2001 |
| 6,607,647 | B2 | 8/2003 | Wilkins et al. | EP | | 1075 868 | 2/2001 |
| 6,607,668 | B2 | 8/2003 | Rela | EP | | 1 101 790 | 5/2001 |
| 6,627,073 | B2 | 9/2003 | Hirota et al. | EP | | 1 106 241 | 6/2001 |
| 6,648,307 | B2 | 11/2003 | Nelson et al. | EP | | 1172145 | 1/2002 |
| 6,649,037 | B2 | 11/2003 | Liang et al. | EP | | 1222954 | 7/2002 |
| 6,726,822 | B2 | 4/2004 | Garcia et al. | EP | | 1388595 | 2/2004 |
| 6,730,227 | B2 | 5/2004 | Zeiher et al. | EP | | 1506941 | 2/2005 |
| 6,766,812 | B1 | 7/2004 | Gadini | EP | | 1762546 | 8/2006 |
| 6,773,588 | B2 | 8/2004 | Beeman et al. | FR | | 2818267 | 6/2002 |
| 6,780,328 | B1 * | 8/2004 | Zhang ........................ 210/663 | GB | | 776469 | 6/1957 |
| 6,783,666 | B2 | 8/2004 | Takeda et al. | GB | | 877239 | 9/1961 |
| 6,808,608 | B2 | 10/2004 | Srinivasan et al. | GB | | 880344 | 10/1961 |
| 6,824,662 | B2 | 11/2004 | Liang et al. | GB | | 893051 | 4/1962 |
| 6,838,001 | B2 * | 1/2005 | Zeiher et al. ................ 210/639 | GB | | 942762 | 11/1963 |
| 6,896,814 | B2 | 5/2005 | Chidambaran et al. | GB | | 1048026 | 11/1966 |
| 6,998,053 | B2 * | 2/2006 | Awerbuch .................. 210/652 | GB | | 1137679 | 12/1968 |
| 7,083,730 | B2 * | 8/2006 | Davis ........................ 210/652 | GB | | 1 381 681 | 1/1975 |

| | | |
|---|---|---|
| GB | 1448533 | 9/1976 |
| JP | 54-5888 | 1/1979 |
| JP | 06000339 A | 1/1994 |
| JP | 07-155750 | 6/1995 |
| JP | 07-265865 | 10/1995 |
| JP | 09-253643 | 9/1997 |
| JP | 11-042483 | 2/1999 |
| JP | 2000126767 | 5/2000 |
| JP | 2001-79358 | 3/2001 |
| JP | 2001-79553 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| JP | 2002-126744 | 5/2002 |
| JP | 2005007347 | 1/2005 |
| JP | 2005007348 | 1/2005 |
| RO | 114 874 | 8/1999 |
| RU | 2004 137231 | 12/2004 |
| SU | 216622 | 11/1972 |
| SU | 990256 | 1/1983 |
| SU | 1118389 | 10/1984 |
| WO | WO 92/03202 | 3/1992 |
| WO | WO 92/11089 | 7/1992 |
| WO | WO 95/32052 | 11/1995 |
| WO | WO 95/32791 | 12/1995 |
| WO | WO 96/22162 | 7/1996 |
| WO | WO 97/25147 | 7/1997 |
| WO | WO 97/46491 | 12/1997 |
| WO | WO 97/46492 | 12/1997 |
| WO | WO 98/11987 | 3/1998 |
| WO | WO 98/17590 | 4/1998 |
| WO | WO 98/20972 | 5/1998 |
| WO | WO 98/58727 | 12/1998 |
| WO | WO 99/39810 | 8/1999 |
| WO | WO 00/30749 | 6/2000 |
| WO | WO 00/64325 | 11/2000 |
| WO | WO 00/75082 | 12/2000 |
| WO | WO 01/49397 | 7/2001 |
| WO | WO 02/04357 | 1/2002 |
| WO | WO 02/14224 | 2/2002 |
| WO | WO 02/26629 | 4/2002 |
| WO | WO 03/040042 | 5/2003 |
| WO | WO 03/086590 | 10/2003 |
| WO | 2004/013048 A2 | 2/2004 |
| WO | WO 2005/087669 | 9/2005 |
| WO | 2005/113120 A1 | 12/2005 |
| WO | WO2005/113120 * | 12/2005 |
| WO | 2006/031732 A2 | 3/2006 |
| WO | WO 2007/145785 | 12/2007 |
| WO | WO 2007/145786 | 12/2007 |

OTHER PUBLICATIONS

Osmonics® Hot-Water Sanitizable RO Systems, Specifications, pp. 1-2. Copyright 2000 Osonics, Inc. www.osmonics.com.

Peterson, R.J. et al., Temperature-Resistant Elements for Reverse Osmosis Treatment of Hot Process Waters, Published Dec. 1983, Filmtec Corporation, Minneapolis, Minnesota 55435. Prepared for the U.S. Departmen of Energy, Under DOE Contract No. DE-FC07-82ID12423 (DOE/ID/12423-TI—DE84005190), pp. 1-69.

Reverse Osmosis Membrane Elements—131 Duratherm®, pp. 1-2, www.osmonics.com Aug. 2002.

U.S.P. Requirements for Water for Injection, pp. 1752-1753, 1927-1929. Aug. 2002.

Weitnauer, Angela et al., Reverse Osmosis for WFI and PW, Published in: Ultrapure Water, Date: Mar. 1, 1996. pp. 1-6. www.osmonics.com.

Wise, Brian, Chemical Processing, Turning Up The Heat, Hot Water Sanitation Membranes Tackle Microbes in RO Permeate Water, pp. 1-6. Aug. 2002.

Wise, Brian et al, "Hot Water Sanitization & RO: A Plain and Simple Introduction", Presented at: Water Conditioning & Purification Magazine; Date Presented: Feb. 1, 2002. OSMONICS®, pp. 1-6. www.osmonics.com.

Wood, Jonathan et al., The Use of Hot Water for Sanitization of RO Membranes in Ultrapure Water Systems, U.S. Filter/Ionpure, Inc., Lowell, MA, USA. Oct. 25, 1995. Presented at the 1997 Fifteenth Annual Membrane Technology/Separations Planning Conference, sponsored by Business Communications Co., Inc., Newton, MA, Oct. 29, 1997, pp. 1-10.

ASTM, "Standard Practice for Calculation and Adjustment of the Langelier Saturation Index for Reverse Osmosis," Designation: D3739-94 (Reapproved 1998), pp. 1-4.

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

Gifford et al., "An Innovative Approach to Continuous Electrodeionization Module and System Design for Power Applications," *Official Proceedings of the 61$^{st}$ Annual Meeting IWC 2000*, Oct. 22-26, 2000, Pittsburgh, PA, Paper No. 0052, pp. 479-485.

Wood, Jonathan et al., "Hot Water Sanitization of Continuous Electrodeionization Systems," *Pharmaceutical Engineering*, vol. 20, No. 6, Nov./Dec. 2000, pp. 1-15.

"Using Desalination Technologies for Water Treatment", Mar. 1988 NTIS Order #PB88-193354.

"Seawater and Brackish Water Desalination in the Middle East, North Africa and Central Asia", A Review of Key Issues and Experience in Six Countries, Dec. 2004.

"Desalination and Water Purification Technology Roadmap", A Report of the Executive Committee, Sandia National Laboratories, Jan. 2003.

"Desalination for Safe Water Supply", Public Health and the Environment World Health Organization Geneva 2007.

Affordable Desalination Sets Low Energy Record, Press Release, http://www.affordableseal.com/home/news/ADC%20Sets%20Low%20Energy%20Record%205-8-06.pdf, May 4, 2006, printed on Apr. 16, 2008.

Wang, "A Study of the electrodeionization process-high-purity water production with a RO/EDI system," Desalination, vol. 132, pp. 349-352, Oct. 3, 2000.

Hyung, Hoon et al., "A mechanistic study on boron rejection by sea water reverse osmosis membranes," Journal of Membrane Science 286 (2006), pp. 269-278.

Desalination Post-Treatment: Boron Removal Process, Lenntech. com (1998-2008), 4 pages.

Bhongsuwan, Darunee, et al., "Development of Cellulose Acetate Membranes for Nano- and Reverse-Osmosis Filtration of Contaminants in Drinking Water," Jurnal Teknologi, 41(F) Keluaran Khas. Dis. 2004, pp. 89-100.

Thanuttamavong, Monthon, et al., "Rejection characteristics of organic and inorganic pollutants by ultra low-pressure nanofiltration of surface water for drinking water treatment," Desalination 145 (2002), pp. 257-264.

Meng-Su, et al., "Rejection of ions by NF membranes for binary electrolyte solutions of NaCl, NaNO3, CaCl2 and Ca (NO3)2," Desalination 191 (2006), pp. 303-308.

"Preliminary Research Study for the Construction of a Pilot Cogeneration Desalination Plant in Southern California," Water Treatment Technology Program Report No. 7, U.S. Department of the Interior May 1995.

Nesicolaci, M., "Reverse Osmosis is Taking Global Water & Wastewater Treatment by Storm," Water Purification Solutions, Severn Trent Services, undated.

Tseng, Tai, et al., "Optimization of Dual-Staged Nanofiltration Membranes for Seawater Desalination"; *American Water Works Association 2003 CA-NC Annual Fall Conference*; Oct. 7, 2003.

"Guidelines for the Safe Use of Wastewater, Excreta and Greywater", *World Health Organization*, vol. 2, Wastewater Use in agriculture, pp. 1-196, undated.

King, C. Judson, et al., "Separation Technology in Japan," *Japanese Technology Evaluation Center*; International Tech. Research Institute, Loyola College in Maryland, pp. 1-143, Mar. 1993.

"Desalting Handbook for Planners," *Desalination and Water Purification Research and Development Program*, Report No. 72, 3$^{rd}$ Edition, Jul. 2003, pp. 1-233.

"Salt Content in Irrigation Water," Lenntech, pp. 1-5, undated.

"Zeta Potential," Lenntech, pp. 1-3, undated.

"SAR Hazard of Irrigation," Lenntech, pp. 1-4, undated.

Hell et al., "Experience with full-scale electrodialysis for nitrate and hardness removal," Desalination 117 (1998) 173-180.

Del Pino et al., "Wastewater reuse through dual-membrane processes: opportunities for sustainable water resources," Desalination 124 (1999) 271-277.

Larchet et al., "Application of electromembrane technology for providing drinking water for the population of the Aral region," Desalination 149 (2002) 383-387.

Sirivedhin et al., "Reclaiming produced water for beneficial use: salt removal by electrodialysis," J. of Membrane Science 243 (2004) 335-343.

Mohammad et al., "Predicting flux and rejection of multicomponent salts mixture in nanofiltration membranes," Desalination 157 (2003) 105-111.

Busch et al., "Reducing energy consumption in seawater desalination," Desalination 165 (2004) 299-312.

Côte, et al, "Use of Ultrafiltration for Water Reuse and Desalination," The ZEEWEED® Ultrafiltration Membrane.

www.waterline.com/content/news/article.asp Microfiltration and Ultrafiltration Hold Huge Potential for the Desalination Pretreatment Market, Nov. 14, 2006.

Côte, et al, "A new immersed membrane for pretreatment to reverse osmosis," Desalination 139 (2001) 229-236.

World Health Organization, Guidelines for Drinking-Water Quality; Chemical Facts Sheet pp. 296-461 (2003).

von Gottberg et al., "Optimizing Water Recovery and Energy Consumption for Seawater RO Systems," Water & Process Technologies, General Electric Technical Paper (2005).

World Bank, "Seawater and Brackish Water Desalination in the Middle East, North Africa and Central Asia," A Review of Key Issues and Experience in Six Countries Final Report, Main Report, Dec. 2004.

Public Health and the Environment World Health Organization, "Desalination for Safe Water Supply, Guidance for the Health and Environmental Aspects Applicable to Desalination," Geneva 2007.

U.S. Bureau of Reclamation, Sandia National Laboratories, "Desalination and Water Purification Technology Roadmap-A Report of the Executive Committee," Jan. 2003.

U.S. Congress, Office of the Technology Assessment, "Using Desalination Technologies for Water Treatment," OTA-BP-O-46 (Washington, D.C.: U.S. Government Printing Office), Mar. 1988.

Almulla et al., "Developments in high recovery brackish water desalination plants as part of the solution to water quantity problems," Desalination 153 (2002) pp. 237-243.

DiMascio et al., "Continuous Electrodeionization: Production of High-Purity Water without Regeneration Chemicals," The Electrochemical Society *Interface*, Fall 1998, pp. 26-29.

DiMascio et al., "Electrodiaresis Polishing (An Electrochemical Deionization Process)," 1994, pp. 164-172.

Farmer et al., Capacitive Deionization of $NH_4ClO_4$ Solutions with Carbon Aerogel Electrodes, *J. Appl. Electro-Chemistry*, vol. 26, (1996), pp. 1007-1018.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.I.Chem.E. Symposium Series No. 9, 1965 (London: Instn chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, Jul. 17, 1998.

Pourcelly, Gerald, Conductivity and selectivity of ion exchange membranes: structure-correlations, *Desalination*, vol. 147 (2002) pp. 359-361.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," *Nature*, vol. 280, Aug. 30, 1979, pp. 824-826.

Watson, "The Basics of Seawater Desalting by Reverse Osmosis," Water & Waste Digest, pp. 16-19, Jan. 2007.

* cited by examiner

METHOD AND APPARATUS FOR DESALINATION

FIELD OF THE INVENTION

The invention relates to a method and apparatus for water purification and, in particular, to water desalination using filtration and electrodeionization.

BACKGROUND OF THE INVENTION

A growing worldwide need for fresh water for potable, industrial, and agricultural uses has led to an increase in the need for purification methods that use seawater, brackish water, or other elevated salinity water as sources. The purification of high salinity water through the removal of dissolved solids, such as salts, has been accomplished in several ways including distillation and reverse osmosis (RO). These methods start with a pretreated feed of seawater or other brackish water and then purify (e.g., desalt) the water to a level that is suitable for human consumption or other purposes. While seawater and often, brackish water, is a plentiful starting material, the energy required to convert it to drinking water using present RO or distillation techniques is often cost prohibitive.

The ocean provides a limitless source of water if efficient desalination techniques can be developed with low environmental impact. While equipment cost can be high, the greatest continuing expense in desalting high salinity water is energy. A small improvement in energy efficiency can result in significant cost savings due to the large volumes of water that are typically processed by desalination systems.

For example, the energy required to produce potable water from seawater by the RO process is comprised primarily of the energy that is required to overcome the osmotic pressure of the seawater, along with pressure loss inefficiencies during processing. Because both RO permeate and RO wastewater (often 70% of the total water fed to the system is lost to waste) must be pressurized, RO energy consumption is much higher than the theoretical thermodynamic minimum for desalination. Expensive mechanical pressure recovery devices are commonly needed in an attempt to recover some of the lost energy required for pressurization.

Seawater typically contains about 20,000-40,000 ppm (mg/l) of total dissolved solids (TDS), and brackish water sources can contain from 2,000 ppm to as much as 20,000 ppm TDS. These dissolved solids include a variety of monovalent, divalent, polyvalent, and/or multivalent salts or species, with sodium chloride typically forming about 75% or more of the total solids content.

While evaporative methods such as distillation have been traditionally used to produce potable water, these methods typically require even greater amounts of energy than do systems utilizing reverse osmosis techniques. Further these systems typically utilize complicated heat recovery techniques to improve energy efficiency. Because RO or distillation based processes operate at elevated pressures or temperatures, and because high salinity water is very corrosive, exotic metals and alloys are needed to withstand the operation conditions, and thus the need to add complicated equipment in these processes to save energy further increases the initial cost of the equipment and greatly decreases the equipment reliability.

Reverse osmosis techniques can be effective at removing ionic compounds from seawater. However, one serious drawback of RO systems is that RO membranes selectively reject non-monovalent or multivalent salts to a higher extent than monovalent salts. Thus for purification purposes in applications such as agriculture, where most divalent ions such as calcium and magnesium are actually beneficial for irrigation use, these ions are rejected selectively, resulting in higher than needed operating pressures, increased potential for membrane fouling and scaling, and/or loss of valuable minerals for use in crop production.

The difference in osmotic pressure between seawater containing over 3.5% solids and potable water at less than, 1,000, or less than 500 ppm, TDS dictates that high pressures be used to produce a permeate of potable quality simply to overcome the thermodynamic free energy potential. In practice, since seawater is usually processed at elevated water recoveries to reduce pretreatment cost by reducing the amount of water that needs to be effectively prepared for treatment, the required osmotic pressure is even higher than needed to process seawater at 3.5% solids. For example, pressures utilized in RO systems are typically greater than 800, 900, or even 1,000 psi and for practical considerations of high pressure operation, corrosion resistance, avoidance of energy losses, and prevention of scaling due to divalent selectivity and silica rejection, are limited in water recoveries (the ratio of product water production to total water production) of around 30% to 40%. This limitation results in a very high incremental cost of pretreatment and water use for RO systems when it is considered that a change in water recovery from about 67% to about 33% results in a doubling of pretreatment equipment costs and a doubling of overall water consumption for a given pure water need. Recent advances in RO membranes and in energy reuse techniques have lowered the power consumption of producing potable water using RO systems to about 7 to 14 kwh per 1,000 gallons (14 kwh/kgal) of water produced.

Alternative techniques using a combination of processes have also provided for lower energy consumption in the conversion of seawater to fresh water. For example, two-pass nanofiltration systems have been shown to be capable of producing potable water using a total working pressure of about 750 psi; about 500 psi in a first stage and about 250 psi in a second stage. Because energy usage relates to operating pressure, a total working pressure of about 750 psi provides for a more energy efficient system compared to a typical RO system operating at a pressure greater than 800 psi. See, for example, the teaching of Vuong in U.S. Patent Publication No. US2003/0205526, which is incorporated by reference herein.

In another method used to produce fresh water from seawater, nanofiltration techniques are used in conjunction with either RO or flash distillation techniques. See, for an example, the teaching of Hassan in U.S. Pat. No. 6,508,936, which is incorporated by reference herein.

SUMMARY OF THE INVENTION

The subject matter of this application may involve, in some cases, interrelated products, alternative solutions to a particular problem, and/or a plurality of different uses of a single system or article.

In one aspect of the invention, a method for purifying water is provided. The method comprises one or more acts of providing a feed water comprising greater than about 1,000 ppm total dissolved solids to a nanofiltration device to produce a first filtrate reduced in total dissolved solids, and feeding the first filtrate to an electrodeionization device to produce a second filtrate comprising less than about 1,000 ppm total dissolved solids.

In accordance with another aspect of the invention, an apparatus for desalinating seawater is provided. The apparatus comprises a nanofiltration device and an electrodeionization device in fluid communication with the nanofiltration device.

In accordance with yet another aspect of the invention, a method for treating seawater or other high salinity water source, to reduce total dissolved solids is provided. The method comprises one or more acts of passing the source water through a water treatment apparatus while applying energy in an amount less than about 7 kwh/kgal of filtrate to the apparatus and removing filtrate from the apparatus, wherein the filtrate comprises less than about 1,000 ppm total dissolved solids.

In accordance with one or more embodiments, the invention is directed to a method of treating seawater. The method comprises acts of reducing a concentration of one or more non-monovalent species from the seawater in a first stage and reducing a concentration of one or more monovalent species from the seawater in a second stage to produce water having a TDS of less than about 1,000 ppm. The first and second stages are performed at a net energy consumption rate of less than about 7 kwh/kgal of product water.

In accordance with one or more embodiments, the invention is directed to a method of treating water having dissolved solids therein comprising acts of reducing a concentration of monovalent dissolved species from the water to produce a byproduct stream, reducing a concentration of divalent dissolved species from the water, and reducing a concentration of dissolved solids from the water to less than about 1,000 ppm in an electrodeionization device.

BRIEF DESCRIPTION OF THE DRAWINGS

Other advantages, features, and uses of the invention will become apparent from the following detailed description of non-limiting embodiments of the invention when considered in conjunction with the accompanying drawings, which are schematic and not drawn to scale. For purposes of clarity, not every component is labeled, nor is every component of each embodiment of the invention shown where illustration is not necessary to allow those of ordinary skill in the art to understand the invention. In the drawings.

DETAILED DESCRIPTION

Figure 1:
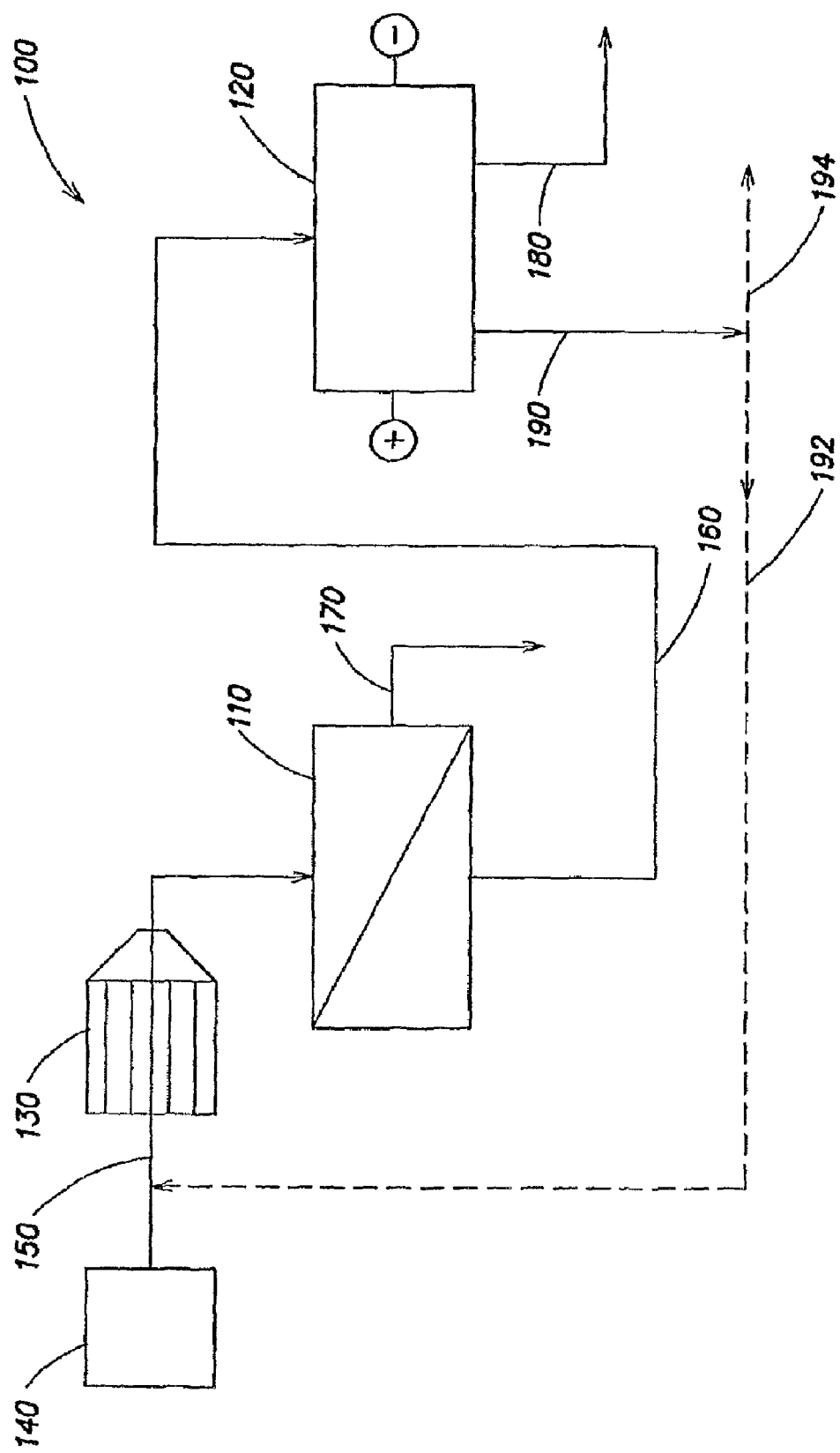
FIG. 1 is a schematic diagram illustrating a system in accordance with one or more embodiments of the invention.

This invention is not limited in its application to the details of construction and the arrangement of components set forth in the following description or illustrated in the drawings. The invention is capable of other embodiments and of being practiced or of being carried out in various ways. In addition, the phraseology and terminology used herein is for the purpose of description and should not be regarded as limiting. The use of "including," "comprising," "having," "containing," "involving," and variations thereof herein, is meant to encompass the items listed thereafter and equivalents thereof, as well as additional items. In cases where the present specification and a document incorporated by reference include conflicting disclosure, the present specification shall control.

Potable water typically has a TDS content of less than about 1,000; in some cases, potable water may have a TDS content less than about 500 ppm. Examples of non-potable water are seawater or salt water, brackish water, gray water, and some industrial water. References to seawater herein are generally applicable to other forms of non-potable water.

Some aspects of the invention relate to methods and apparatus for purifying seawater, and other non-potable water, which utilize, inter alia, electrodesalting and electrochemical systems, and techniques that may be combined with pressure driven membrane systems and/or water treatment systems. Electrochemical techniques can also include processes such as continuous deionization, filled cell electrodialysis, electrodiaresis, and current reversing electrodialysis. As used herein, "purify" relates to reducing the total dissolved solids content and optionally to reducing the concentration of suspended solids, colloidal content and ionized and non-ionized impurities in a source water to a level where the purified water has been rendered potable and can be used for fresh water purposes such as, but not limited to, human and animal consumption, irrigation, and industrial applications. Desalination is a type of purification in which salt is removed from seawater. The invention, in some aspects, pertains to desalination of seawater. The feed water or water to be treated may be from a variety of sources including those having a TDS content of between about 3,000 ppm and about 40,000 ppm, or more. Feed water can be, for example, seawater, brackish water, gray water, industrial effluent, and oil fill recovery water. The feed water may contain high levels of monovalent salts, divalent and multivalent salts, and organic species.

In accordance with one or more embodiments, the invention is directed to a method of treating seawater or brackish water where the source water comprises a solute mixture wherein monovalent ions are at a higher the concentration as compared to the concentrations of divalent and other multivalent ions. An optional initial step comprising microfiltration treatment or ultrafiltration treatment is provided to remove suspended solids, colloidal substances and/or solutes of elevated molecular weight. Following the optional step, in this embodiment, a first stage of specialized electrodesalting treatment is provided to selectively remove a fraction of the monovalent ions and, following any intermediate treatment step, is followed by a stage comprising a second membrane treatment step such as electrodeionization to provide water having a desired final purity. The overall process is capable of operating at water recovery of from 30% to 70% or more.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. See, for example, U.S. Pat. Nos. 6,824,662; 6,312,577; 6,284,124; 5,736,023; and 5,308,466; each of which is incorporated by reference herein. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. In accordance with further embodiments of this invention, the reaction products of the electrode compartments, such as generated chlorine gas and sodium hydroxide, can be utilized in the process as needed for disinfection purposes, for membrane cleaning and defouling purposes, and for pH adjustment purposes.

In accordance with some embodiments of the invention, a plurality of stages in a treatment system can be utilized to purify water or at least reduce the concentration of dissolved solids therein. For example, water to be treated can be purified in stages such that each stage selectively removes one or more types of dissolved solids thereby producing purified, e.g., desalted, or even potable, water. In some cases, one or more stages can comprise one or more unit operations that effects selective retention of a type of dissolved species, which can then be removed in one or more subsequent or downstream stages utilizing one or more other unit operations. Thus, in some embodiments of the purification system of the invention, a first stage can remove or at least reduce the concentration of one type of dissolved species. In other embodiments, the first stage can remove or reduce the concentration of all but one type of dissolved species. Any retained species, not removed from the water, can then be removed or the concentration thereof reduced in one or more subsequent stages.

Some embodiments of the invention relate to aspects that advantageously utilize byproduct streams from one or more stages to effect regeneration or recharging of one or more other stages. A dischargeable stream or byproduct stream from one or more stages of the system of the invention can have a high concentration of a first dissolved species removed from the water to be treated. The presence of the first dissolved species in such a stream can facilitate regeneration of other unit operations in one or more other purification stages. For example, an electrodialysis stage can remove or reduce the concentration of monovalent species from seawater. For example, Table 1 provides concentrations of primary typical solutes found to make up the salts comprised in a typical seawater. Based on those constituents and assuming about 80% overall TDS (total dissolved solids) removal in a first stage operating at about 67% water recovery, comprising monovalent selective anion and cation exchange membranes, the solute makeup of the depleting and concentrating stream effluent from the stage as a function of membrane selectivity coefficient can be determined. Membrane selectivity coefficient can be defined as $$\text{Selectivity} = \frac{\frac{\Delta v_{Na}}{v_{Na}}}{2\left[\frac{\Delta v_{Ca} + \Delta v_{Mg}}{v_{Ca} + v_{Mg}}\right]}$$

where $v$ is the molarity of ionic species $i$ and $\Delta v$ is the change in the molarity of the ionic species. Table 2 provides calculated values of solutes remaining in the ion depleting stream and ion concentrating stream effluents from a first stage separation apparatus comprising monovalent selective anion and cation membranes with selectivities of 1 (non-selective), 5, and 10. The data in Table 2 were derived for a product water with about 20,000 ppm TDS and an assumed recovery rate of about 67%.

TABLE 1

Seawater Typical Composition.

| Species | Concentration Ppm |
|---|---|
| Chloride | 19,000 |
| Sulfate | 2,700 |
| Bromide | 65 |
| Silicate | 3 |
| Iodide | 0.06 |
| Phosphate | 0.07 |
| Sodium | 16,500 |
| Magnesium | 1,350 |
| Calcium | 400 |
| Potassium | 380 |
| Lithium | 0.17 |
| Boron | 4.6 |
| Strontium | 8 |
| Molybdenum | 0.01 |
| Manganese | 0.002 |
| Aluminum | 0.01 |
| Cadmium | 0.00011 |
| Chromium | 0.00005 |
| Cobalt | 0.0004 |
| Copper | 0.003 |
| Iron | 0.06 |
| Lead | 0.00003 |
| Nickel | 0.007 |
| Selenium | 0.00009 |
| Silver | 0.0003 |
| Zinc | 0.01 |

TABLE 2

Depleting and concentrating Stream properties using softened seawater into 2-stage ED devices.

| Monovalent Selective ED | | Double Selective ED | | Non-Selective ED | |
|---|---|---|---|---|---|
| Ca concentration, mmol/L | LSI | Ca concentration, mmol/L | LSI | Ca Concentration, mmol/L | LSI |
| 5.1 | 1.08 | 2.63 | 0.79 | 17.78 | 1.62 |

As can be seen in Table 2, for devices comprising monoselective membranes, the concentrations of solutes such as calcium, magnesium, and sulfate, which tend to cause fouling and scaling of the concentrating compartments of the device, are maintained at relatively low concentration levels in the concentrating stream relative to devices utilizing comprising nonselective membranes. The result is that use of monovalent selective membrane devices enables increased water recovery without causing salt precipitation and resulting performance loss, or plugging of the desalting device. Monovalent selectivity may not necessarily disproportionately lower bicarbonate levels in the concentrating stream, but the potential for precipitation of bicarbonate compounds such as calcium bicarbonate is nevertheless reduced because of the disproportionate lowering of calcium levels (e.g., relative to sodium) in the concentrating stream. In addition, as will be discussed in more detail, acidic electrolyte products from the use of high salinity sodium chloride as an electrolyte can be used as a reagent feed to the concentrate stream, to adjust and lower the pH of the concentrate stream and thus inhibit the potential of any residual calcium bicarbonate in the concentrate stream to form scale, by shifting the bicarbonate equilibrium away from the carbonate form.

The byproduct stream (e.g., the concentrate stream of a monoselective ED stage) would have a high concentration of such species, e.g., sodium chloride, which can then be utilized to facilitate regeneration of an ion exchange unit operation that may then optionally be utilized to selectively remove or reduce the concentration of dissolved divalent species from the water to be treated. Moreover, where further stages including other types of unit operations are utilized to further remove or reduce the concentration of remaining species and/or trace impurities from a fraction of, or all the depleting stream, so that problematic constituents that remain in the depleting stream effluent of the first stage are selectively removed before end use (e.g., boron removal via selective ion exchange prior to being provided for agricultural irrigation water) or prior to being fed to a second membrane state of the overall system (e.g. calcium and magnesium removal via chemically regenerable cation exchange to avoid plugging and scaling in the second membrane stage).

By placing the optional ion exchange unit downstream of the first monoselective removal stage there is additional process advantage with respect to operation of the ion exchange unit. Operation of an ion exchanger, e.g., a cation exchanger for removal of calcium and magnesium from a source water, is much less efficient in its removal capability if the source water is high in overall salinity. Thus, by operation of the ion exchanger downstream of the first salt removal stage, whereby a large fraction of the salts are already removed compared to the source water, the ion exchanger will operate more efficiently and produce better quality effluent with less chemical need for regeneration.

Moreover, where further stages including types of units of operations are utilized to further remove or reduce the concentration of remaining species from the water stream, any byproduct streams therefrom can also be utilized to facilitate regeneration of one or more other unit operations in the other stages.

Other aspects of the invention can be considered as being directed to reducing the overall byproduct or waste discharge burden associated with purification of the water to be treated. Indeed, a byproduct stream from one or more stages or unit operations can be directed to one or more upstream or downstream stages or unit operations and be combined with water to be treated and/or be utilized to facilitate the operation of such unit operations.

In accordance with one or more aspects of the invention, EDI systems and techniques, including CEDI systems, can be combined with one or more techniques to purify non-potable water, for example water having greater than about 5,000 ppm TDS, to produce potable water. In accordance with one or more embodiments of the invention, one or more states comprising pressure-driven separation techniques such as filtration to remove a portion of the TDS in water from a non-potable water source, and one ore more electrically-driven separation techniques such as electrodeionization to remove an additional portion of the TDS in the first filtered water to eventually produce potable water. The pressure-driven separation technique, in some cases, can be based on nanofiltration (NF) systems and techniques. In accordance with other embodiments, electrically-driven separation techniques such as, but not limited to, electrodialysis or electrodiaresis, can be utilized with, for example, filtration and/or EDI systems and techniques to purify, e.g., desalinate, water. Further embodiments of the invention contemplate utilizing combinations of such systems and techniques. Thus, for example, electrodeionization systems can be utilized with two or more systems that, in combination, preferentially remove one or more types of dissolved solids. Indeed, in accordance with one or more embodiments of the invention, an electrodeionization stage can be utilized with an electrodialysis stage and/or an ion exchange stage.

Nanofiltration techniques can be used to remove species smaller than that which can be removed by ultrafiltration (UF) techniques, but typically does not remove all species that can be removed by reverse osmosis techniques. Nanofiltration membranes can incorporate both steric and electrical effects in rejecting or selectively separating dissolved species. Thus, for example, nanofiltration membranes may also remove or reduce the concentration of uncharged organic molecules including, for example, organic molecules having a molecular weight of greater than about 150 Daltons or, in some cases, greater than about 300 Daltons. Divalent and/or multivalent ions are typically removed at a rate of greater than about 90%. However, in some cases, greater than about 95%; and in some applications, greater than about 98% of the multivalent species can be removed by such selective techniques. Nanofiltration systems, however, are typically less efficient at removing monovalent ions than divalent or non-monovalent ions and may remove, for example, less than about 10%, less than about 25%, less than about 50%, less than about 75%, or less than about 90% of the monovalent ions present in a feed water to be treated. Nanofiltration membranes may be made from a variety of materials, including, for example, polyamide materials. See, for example, U.S. Pat. Nos. 6,723,241 and 6,508,936 as well as U.S. Patent Pub. No. 2003/0205526; each of which is incorporated by reference herein.

As noted, in some instances nanofiltration systems and techniques may not remove monovalent ions efficiently or at least to an extent that is desirable and/or economically practical. Seawater, however, typically has a TDS content that is about three quarters in the form of monovalent salts. Table 1 lists the typical concentration of various, but not necessary all, species in seawater.

The associated operating pressure required to treat water utilizing nanofiltration membranes can be significantly less than the operating pressure required to pass water through RO membranes, where the monovalent salts contribute greatly to the difference in osmotic pressure between the feed and the permeate. Depending on the application, feed water may be purified in a nanofiltration device at an operating pressure of less than about 600 psi; in some cases, at an operating pressure of less than about 500 psi; or in other cases, at an operating pressure of less than or equal to about 400 psi. The permeate resulting therefrom typically is reduced in organic species concentration and divalent and nonmonovalent ions concentration by greater than about 90%, while retaining more than about 10% of the monovalent ionic constituents. Depending on the specific configuration and the feed water, more that about 25% of the monovalent ions are retained or retrieved; in some applications, more than about 50% of the monovalent ions are retrieved; and in other applications, more than about 75% of the monovalent ionic constituents are retrieved. Therefore, a nanofiltration device having seawater, brackish water, or feed water having similar composition, can provide a filtrate that is substantially reduced in divalent and non-monovalent ionic constituents, and/or organic constituents but may retain a significant portion of the initial monovalent ion constituents, such as, sodium chloride. The filtrate, when compared to the feed, may exhibit a reduction in TDS of greater than or equal to about 30% (in some cases, up to and including about 95%). In most cases, however, a one-pass nanofiltration filtrate from seawater is unsuitable for human consumption or use in applications requiring fresh water and further treatment may be required to render the water suitable.

In accordance with one set of embodiments of the invention, the product such as the filtrate from a nanofiltration stage is fed to an electrodeionization stage (such as a CEDI device). The divalent and multivalent cations, such as magnesium and calcium, which typically contribute to hardness may, in a large extent, be removed in the nanofiltration stage or an intermediate ion exchange softener downstream of a monovalent selective ED stage. Electrodeionization devices can, in turn, remove monovalent cations and/or anions, such as sodium chloride and further, operate at lower power consumption on feed waters devoid of divalent ions. Thus, a feed water that contains TDS of primarily monovalent salts can be efficiently purified by passing the water through one or more electrodeionization devices and one or more nanofiltration devices. One or more passes at each stage may be employed and two or more electrodeionization devices can be used in series or any suitable arrangement. Typically, but not necessarily, the nanofiltration stages precede the electrodeionization stages. Such configurations can lead to a decrease in, or even an absence of, fouling of downstream unit operations and/or components, such as in the concentration compartments and associated housing assemblies of an electrodeionization device as well as, fittings and conduits. Therefore, one or more nanofiltration devices can be advantageously used to remove divalent and/or multivalent ions, such as hardness-causing species, and one or more electrodeionization devices can be advantageously used to remove monovalent ions, thus reducing or eliminating fouling tendencies. Indeed, the invention can be directed to systems and techniques that provide one or more stages or unit operations that can remove, or at least reduce the concentration of, one or more divalent and/or multivalent species from a water stream; and one or more stages or unit operations that can remove, or at least reduce the concentration of, one or more monovalent species from the water stream. The resultant product water can thus be rendered potable.

Other aspects of the invention are directed to systems and techniques of purifying a water stream by reducing, or even minimizing, a tendency of one or more species in a water stream to form scale or foul the membrane devices, in a first stage, or preliminary stages, and by removing, or at least reducing a concentration of monovalent species, in a second stage or subsequent stages.

The first stage, e.g., filtration such as nanofiltration, can be operated at an energy requirement of less than or equal to about 4.7 kwh/kgal. The second stage, e.g., by electrochemical, such as electrodeionization, can be operated at less than or equal to about 2.3 kwh/kgal. Thus, an overall energy usage of about 7 kwh/kgal can be expected, which provides a significant decrease in energy consumption when compared to other desalination techniques, such as evaporative, RO, two-pass nanofiltration or hybrid nanofiltration/RO, and nanofiltration/evaporative techniques.

In accordance with one or more embodiments of the invention, retentate (reject) and concentrate containing fluids that result from the process, typically containing greater amounts of TDS than their respective feed waters, can be discharged to the feed water source or to conventional wastewater treatment facilities. Concentrate effluent from, for example, a CEDI device, can be recycled as feed to or combined with feed water to a nanofiltration device. In some cases, for example when a concentrated brine is produced from the concentrate compartments of a CEDI device, the brine, which may be substantially or essentially free of divalent and multivalent ions, or have a reduced level of scale-forming species, can be used as a brine source for the production of a disinfectant, such as, but not limited to, sodium hypochlorite. The softened brine solution can provide a source of electrolyzable chlorine species for use in a disinfectant-forming system which can utilize, for example, an electrolytic device. Thus, if purified water produced utilizing some aspects of the invention can benefit from later disinfection, a ready source of softened, concentrated brine, and/or disinfectant, can be available at low cost.

Prior to treatment of feed water, a variety of pre-treatment procedures can be employed. For example, pretreatment techniques may be utilized on a feed water that may contain solids or other materials that may interfere with or reduce the efficiency of any stage or device, such as the nanofiltration device or the EDI device. Pretreatment processes may be performed upstream of the nanofiltration device and/or the EDI device and may include, for example, particulate filtration, sand filtration, carbon filtration, microfiltration, such as cross-flow microfiltration (CMF), combinations thereof and other methods directed to the reduction of particulates. Adjustments to the pH and/or alkalinity of feed water may also be performed by, for example, the addition of an acid, base or buffer, or through aeration.

A particularly important optional advantage of the embodiment comprising a first monovalent selective stage is that because the water recovery of such a system is higher than possible using present technology, the amount of pretreatment required to process the source water is greatly diminished. Thus the amount of needed pretreatment equipment is decreased proportionately. The result is a reduced cost and size of pretreatment equipment, and/or alternately, enables the implementation of pretreatment systems that would not normally be considered economically feasible. For example, membrane microfiltration, a technique that removes not only bulk particulates, but also microbial contaminants and other harmful colloidal constituents in a source water, can be used more cost-effectively as a substitute for traditional and less effective sand filtration systems. This improves end use water quality while increasing the reliability of downstream treatment components.

One embodiment of a system of the invention is illustrated in FIG. 1. System 100 includes one or more nanofiltration devices 110 as well as one or more electrodeionization devices 120. Nanofiltration device 110 comprises a nanofiltration membrane disposed in a housing. Electrodeionization device 120 comprises one or more anode, cathode, concentration, and depletion compartments. Water sources are provided for depletion, concentration, and electrode compartments of electrodeionization device 120. A feed water source 140 may be, for example, the ocean. Feed water can be pumped through conduit 150 and be pressurized by pump 130 to pass through the nanofiltration membrane in nanofiltration device 110. Typically, pump 130 pressurizes the feed to an operating pressure of about 600 psi or less. Permeate from nanofiltration device 110, reduced in multivalent ionic content, passes through conduit 160 as a feed stream to electrodeionization device 120. Reject fluid from device 110 passes through conduit 170 and may be directed, for example, back to the feed water source 140.

Energy may be recovered from the retentate stream and used, for example, to heat feed water, provide electricity, and/or to provide energy for other processes or unit operations, which need not be directly associated with system 100. Water in conduit 160 may be fed to any of the depletion, concentration, and/or electrode compartments of electrodeionization device 120. Electrodeionization device 120 is typically powered by a source of electric current (not shown), which may be configured to provide a reversible electric field. Purified diluent is received at conduit 180 where it may be sent for use or storage as potable water. Potable water may be preserved or further disinfected, if desired. A concentrate stream from electrodeionization device 120 may be discharged to waste via conduit 190, may be recycled through the system via conduit 192, or may be used as a source of brine via conduit 194. The concentrate stream may have a sodium chloride content similar to that of seawater and can be a source of feed water to nanofiltration device 110.

The systems and techniques of the invention may be operated on a continuous or a batch basis, and may be operated at a fixed location or on a mobile platform, such as on board a vessel or on a vehicle. Multi-pass CEDI systems may also be employed wherein feed is typically passed through the device two or more times, or may be passed through an optional second device. In some cases, the electrodeionization device may be heated to, for example, increase the rate of ionic species transport therein. Thus, the electrodeionization device may be operated at ambient temperature; alternatively, the electrodeionization device may be operated at a temperature greater than about 30° C., greater than about 40° C., or even greater than about 50° C.

In some cases, it may be desirable to reduce the internal electrical resistance of the electrodeionization device to minimize energy usage. Therefore, in accordance with one or more embodiments of the invention, low electrical resistance membranes may be used to separate or define depletion and/or concentration compartments thereof. For example, individual compartments, or cells of the electrodeionization device, may be constructed to have a width of less than about 10 millimeters. The use of low electrical resistance membranes and/or thin compartments can help to reduce electrical resistance or load and, therefore, serve to decrease electrical power requirements. Low electrical resistance membranes that may be utilized in accordance with some embodiments of the invention include, for example, those commercially available as NEOSEPTA® membranes, from ASTOM Corporation, Tokyo, Japan. In some embodiments of the invention, intermembrane spacing may be, for example, less than about 0.1 inch, less than or equal to about 0.06 inch, or less than or equal to about 0.05 inch.

In some applications, it may be important or desirable to reduce the concentration of boron species in a water to a level that is considered to be suitable for agricultural service and/or human consumption. For example, the desired concentration of boron species can desirably be less than about 1 ppm. In some cases, the concentration of boron species is desirably about or even less than the level as suggested by government and/or health organizations. For example, the concentration of boron can be at about or less than the level suggested by the World Health Organization, at about 0.5 ppm. Indeed, in some applications, the concentration of boron in the treated water is preferably less than about 0.4 ppm.

Because seawater often contains high levels of boron, for example, about 1 to about 4 ppm, this target, recommended or suggested boron level can be difficult to achieve utilizing conventional desalination processes. Advantageously, the systems and techniques of the invention can be utilized to reduce boron species concentration in feed water to an acceptable level. Indeed, some embodiments of the invention are directed to systems and techniques that reduce the boron concentration in a feed stream from about 4.6 ppm to less than about 0.5 ppm.

In addition to lower energy costs, the systems and techniques of the invention can provide lower capital, operating, and/or maintenance costs. For example, due to an ability to operate at lower operating pressures, lower cost materials, such as plastic piping, can be employed in the systems of the invention, instead of high pressure stainless steel and/or titanium alloys that are typically necessary in RO systems.

To purify seawater, the water needs to be separated from its dissolved components. The energy required to perform this separation is the amount of energy required to overcome the difference in osmotic pressure between the feed water (seawater) and the product (fresh water).

The osmotic pressure of seawater, $P_{sw}$, can be determined from the van't Hoff equation: $P_{sw}=c*R*T$, where c is the ionic molar concentration, R is the gas constant, 0.082 liter-bar/degree-mole, and T is the absolute temperature in Kelvin, T=300 K (about 27° C.). The ionic salt concentration in seawater is about 1.12 mole/liter, assuming a pure sodium chloride solution. Therefore, the osmotic pressure is determined to be about 400 psi (1.12*0.082*300=27.6 bar).

Desalination energy requirements are typically provided per 1,000 gallons of purified water per hour. An estimate of the theoretical minimum energy required to desalinate seawater is about 2.9 kwh/kgal (or about 0.77 kwh/m³), determined as follows, assuming about 400 psi of trans-membrane pressure (for the NF membrane) and 100% pump efficiency:

$$\text{Brake horsepower} = \frac{(\text{gpm})(\text{psi})}{(1715)(\text{eff})} = \frac{(16.67)(400)}{(1715)(1)} = 3.89 \text{ bhp}(2.9 \text{ kw})$$

The method used (thermal or pressure driven) to desalinate seawater is believed to be independent from the minimum energy required.

Example 1

A comparison of state of the art RO-based systems with the systems and methods of the invention illustrate the energy savings that are achievable. A conventional RO-based system requires about 19.2 kwh/kgal to desalinate seawater as shown by the following calculations. In the calculations, the assumed trans-membrane pressure is about 900 psi, the assumed pump efficiency is about 85%, and the assumed water recovery is about 40%. Further, for an inlet flow rate of about 41.67 gpm, about 16.67 gpm of permeate and about 25 gpm of reject is produced. No energy recovery techniques are assumed to be utilized.

$$\text{Brake horsepower} = \frac{(\text{gpm})(\text{psi})}{(1715)(\text{eff})} = \frac{(41.67)(900)}{(1715)(.85)} = 25.73 \text{ bhp}(19.2 \text{ kw})$$

However, if energy recovery techniques are utilized, the calculated energy requirement can be reduced. Examples of energy recovery assemblies or techniques include, for example, a turbine, such as a Pelton wheel, or a pressure exchange device. Both types of devices can recover the energy from the high-pressure reject stream and transfer the energy to the feed stream of the RO device. A Pelton wheel assembly is typically about 80% efficient in recovery and positive displacement systems typically claim recovery efficiencies of about 90% to about 95%.

To calculate the effect of energy recovery on the overall power consumption, about 40% of the power is assumed as being consumed in the permeate stream (0.4*19.2 kwh/kgal=7.68 kwh/kgal), and about 60% of the power is assumed as being consumed in the reject stream (0.6*19.2=11.52 kwh/kgal). Assuming that, for example, about 93% of the energy in the reject stream can be recovered, about 7% is thus consumed (0.07*11.52=0.81 kwh/kgal). Therefore, the overall power consumption of an RO device, utilizing energy recovery techniques, is about 7.68+0.81=8.49 kwh/kgal.

Example 2

To estimate the amount of total energy required to desalinate seawater utilizing a system comprising a combination of nanofiltration and electrodeionization devices, the energy requirements for each are independently determined and then combined.

The energy requirement associated with the NF device is approximated to be about 10.7 kwh/kgal (about 2.8 kwh/m³) as shown by the following calculation.

$$\text{Brake horsepower} = \frac{(\text{gpm})(\text{psi})}{(1715)(\text{eff})} = \frac{(41.67)(500)}{(1715)(0.85)} = 14.3 \text{ bhp}(10.7 \text{ kw})$$

This estimate was derived by assuming that the trans-membrane pressure was about 500 psi, the pump efficiency was about 85% pump efficiency, and the water recovery was about 40%. This estimate was further based on an inlet flow rate of about 41.67 gpm, producing about 16.67 gpm of permeate and about 25 gpm of reject. No energy recovery techniques were utilized.

Energy techniques can also be utilized in nanofiltration devices in a manner similar to that described above with respect to RO-based devices. Further, similar assumptions are utilized with respect to recovery efficiencies: about 40% of the power is assumed as being consumed by the permeate stream (0.4*10.7 kwh/kgal=4.28 kwh/kgal), and about 60% of the power is assumed as being consumed by the reject stream (0.6*10.7=6.42 kwh/kgal). If about 93% of the energy in the reject is recovered, then about 7% is assumed as being consumed (0.07*6.42=0.45 kwh/kgal). Thus, the power consumed associated with the nanofiltration device would be about 4.73 kwh/kgal (4.28+0.45=4.73 kwh/kgal).

To consume less energy than an RO system, a desalination system comprising nanofiltration and CEDI stages would, in aggregate, need to consume less energy than the RO system alone. As shown above, the nanofiltration stage consumes about 4.7 kwh/kgal while the total energy consumption of the RO system is about 8.5 kwh/kgal. Thus, to exhibit total energy consumption below that of the RO system, the power consumption of the CEDI stage is preferably less than or equal to about 3.8 kwh/kgal.

If the nanofiltration system rejects about 91% of the inlet total dissolved solids contained in seawater feed, the downstream CEDI module would preferably remove about 90% of the remaining TDS in order for the water to meet drinking water standards of less than 500 ppm TDS. To be competitive with RO systems, therefore, the CEDI module may need to remove this amount of solids using less than about 3.8 kwh/kgal of water produced.

Example 3

A system was operated to determine if seawater can be purified (desalinated) to a level of less than about 500 ppm TDS. The system was comprised of a nanofiltration device and CEDI devices that meets the above-mentioned energy requirement (less than about 3.8 kwh/kgal). Artificial seawater was prepared from INSTANT OCEAN® synthetic sea salt mix, available from Aquarium Systems, Mentor, Ohio.

The nanofiltration and CEDI devices were operated under the following conditions:

Closed loops were utilized for both nanofiltration and CEDI devices. Electrode compartment feed water for the CEDI device, which was separate from the nanofiltration product water, was made up from RO water, with $H_2SO_4$ added to achieve a pH of about 2. Feed water calcium content was approximately 50 mg/l, measured as $CaCO_3$.

The nanofiltration device utilized a FILMTEC® NF90 (4×40) membrane, available from The Dow Chemical Company, Midland, Mich. The inlet water stream into the nanofiltration device was pressurized to about 500 psi and had a conductivity of about 45.5 mS/cm. The permeate from the nanofiltration device had a conductivity of about 4.2 mS/cm at a flow rate of about 3.25 l/m. The reject flow rate was about 36 l/m. The nominal operating temperature of the device was about 23° C.

Two different CEDI devices were evaluated, designated as Stack A (lower electrical resistance) and Stack B (standard). Each of Stacks A and B were comprised of 20 cell pairs in a 2-stage folded path, with 10 cell pairs in each stage. The flow path length was about 28 inches. Both stacks also utilized an iridium oxide-based anode, a stainless steel cathode, and an about 50/50 mix of DOWEX™ MARATHON strong base anion/strong acid cation resins, both from The Dow Chemical Company, Midland, Mich. The inter-membrane spacing of each of Stacks A and B was about 0.06 inch. Stack A included alternating ion exchange membranes.

The operating conditions and performances of both modules is summarized in the Table 2, below. The energy demand data listed in Table 2 does not consider the power supply efficiency.

The data shows that Stack A is preferred over stack B because the former produces similar quality product at a similar rate while using about 40% less energy.

Thus, assuming that the nanofiltration device requires about 4.7 kwh/kgal to achieve the desired performance of less than about 90% removal, the system comprising nanofiltration and CEDI devices would yield a power consumption of about 7 kwh/kgal. This overall energy requirement is about 15% less than the energy requirement of a conventional RO-based system.

TABLE 3

Operating and Measured Parameters of CEDI Stacks A and B.

| Operating or Measured Parameter | Stack A | Stack B |
|---|---|---|
| Flow Rate through the Dilution Compartment (ml/min) | 280 | 280 |
| Flow Rate through the Concentration Compartment (ml/min) | 72 | 73 |
| Flow rate through the Electrode Compartment, (ml/min) | 250 | 200 |
| Feed Stream Conductivity (mS/cm) | 4.2 | 4.2 |
| Product Conductivity (μS/cm) | 570 | 550 |
| Dilution Compartment Pressure Drop (psi) | 5.6 | 7.5 |
| Concentration Compartment Pressure Drop (psi) | 2.2 | 3.6 |
| Electrode Compartment Pressure Drop (psi) | 6.4 | 8.9 |
| Applied Electrode Potential (VDC) | 17.15 | 26.6 |
| Cell Pair Voltage (VDC) | 13.5 | 22.0 |
| Voltage per Cell Pair (VDC) | 0.675 | 1.1 |
| Current Consumption (A) | 0.84 | 0.83 |
| Energy Consumption (kwh/kgal) | 2.5 | 4.2 |
| Operation Duration (hours) | 175 | 274 |
| Product TDS (ppm) | 240 | 232 |

Example 4

This example describes further embodiments of the invention that can be utilized to reduce the concentration of dissolved solids in seawater.

Figure 2:
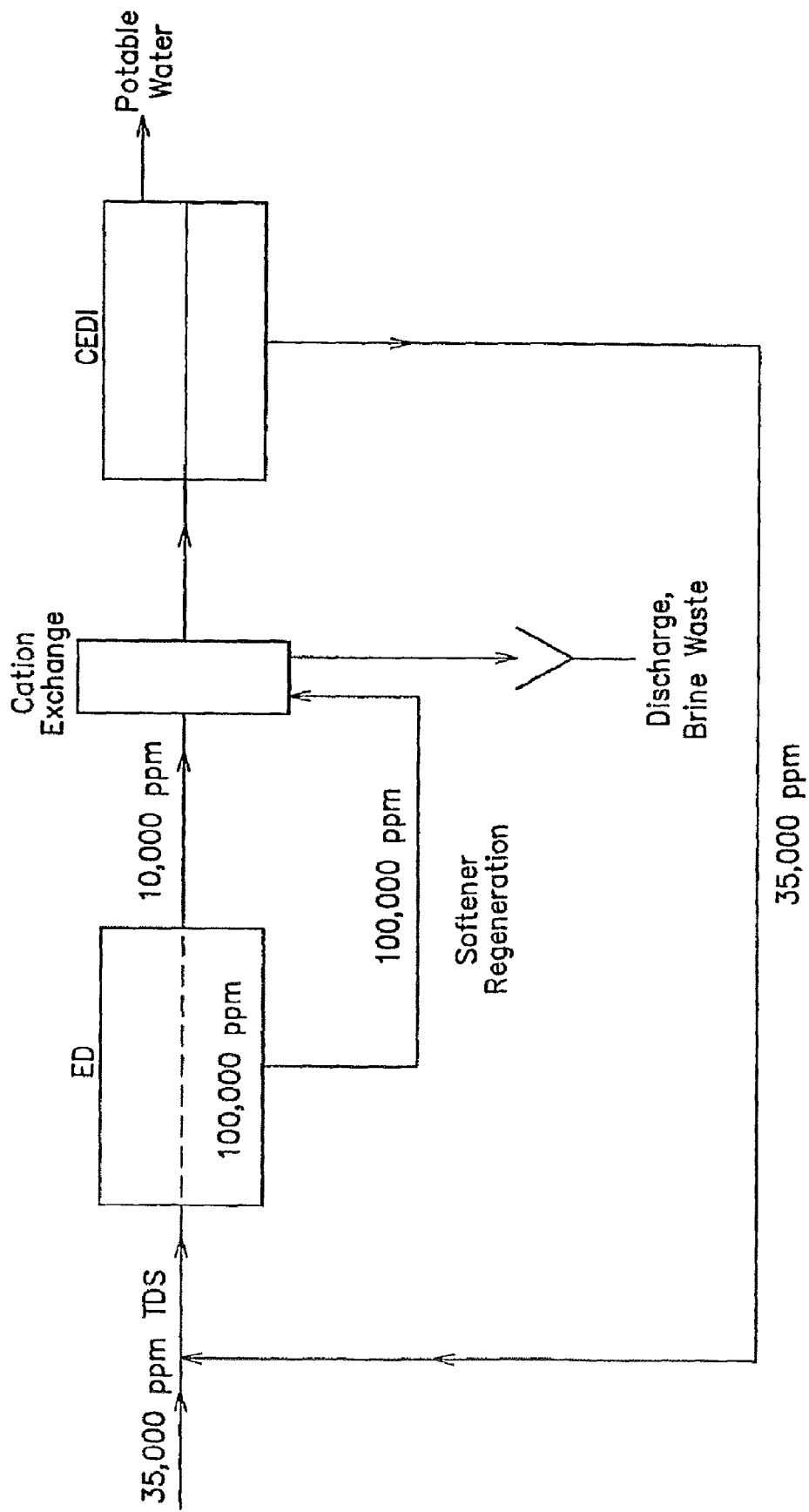
FIG. 2 is a schematic diagram illustrating a system in accordance with one or more further embodiments of the invention.

As illustrated in FIG. 2, the system can comprise at least one electrodeionization stage disposed downstream of one or more monovalent species-reducing stages and one or more divalent species-reducing stages.

The monovalent reducing stage can comprise any unit operation that reduces the concentration of monovalent species such as, but not limited to, sodium chloride. Examples of unit operations that can serve to reduce the concentration of monovalent dissolved solids include, but are not limited to, electrodialysis and electrodiaresis devices.

This monovalent species reducing stage can operate at elevated water recovery, for example, about 60% to 70% or higher depending on the selectivity coefficient of the membrane with respect to monovalent species versus non-monovalent species. This is due to the avoidance of the potential for nonmonovalent or multivalent species to scale or foul the membrane devices, since their concentration does not increase in the same proportion as monovalents species. Such a device is much less prone to fouling and scaling relative to other processes such as non-selective ED, or distillation, and very much less prone to fouling and scaling relative to processes such as NF and RO, which selectively concentrate multivalent species and foulants over monovalent species. By operating at elevated water recovery, not only is the process more efficient by, for example, reducing the volume requirements for pretreatment equipment and materials, but also the total amount of water required for the overall process is reduced, which is of particular importance in regions with scarce water resources. In addition, by operating at high water recovery, the concentration of salt in the concentrate stream of the device is increased, rendering it more useful in certain circumstances. For example, by operating on a feed salinity of about 3.33% at an about 67% recovery, a concentrate stream can be obtained with a concentration of about 10% salt. In the case where predominantly monovalent ions are selectively transferred to said concentrate stream, the resulting stream can be a predominantly pure monovalent (e.g., sodium chloride) stream at a concentration of about 10%. Such as stream can be used in part to regenerate ion exchange columns that have become exhausted, for use as brine cleaning agents, for feed to crystallizers to efficiently produce crystalline salts, and/or in further electrochemical processes to produce, for example, chlorine and caustic for disinfection or pH adjustment. Further, the concentrated salt can be cycled to the electrolyte compartments of the ED device itself, and by-product chlorine and caustic, can be produced without the need for a separate caustic/chlorine generation system, and avoid the need to provide added chemicals other than salts already in the feed water to be desalted.

The monovalent species removal stage can utilize membranes that selectively remove monovalent cations, monovalent anions, or both monovalent anions and cations. If it is desirable to produce pure sodium chloride from a feed comprising calcium and sulfate salts, then the system can comprise both monovalent selective anion membranes and cation membranes. Alternatively, if the objective is only to produce a concentrate comprising pure sodium ions without concern for sulfate levels, then the system can comprise only monovalent selective cation membranes The partially desalted product from the monovalent selective removal stage can then be sent to a divalent-reducing stage which can comprise any unit operation that reduces the concentration of divalent species such as, but not limited to, calcium and magnesium salts. Examples of unit operations that can serve to reduce the concentration of such hardness causing species include, but are not limited to, ion exchange devices, in particular, cation exchange columns utilizing cation exchange media. In addition, ion exchange media incorporating selective absorbents and anion selective media can be used to selectively remove problematic trace ions from the water, such as residual boron and bicarbonate, as well as divalent anions, such as sulfate. For selective absorbents that require not only brine regeneration steps but also acid or caustic regeneration steps, the acid and caustic can optionally also be manufactured from the concentrated pure salt solution from a first stage concentrate effluent from a first monoselective membrane stage.

Embodiments represented by FIG. 2 further illustrate utilization of a byproduct stream from one stage in another stage to facilitate operation thereof. As exemplarily shown, the monovalent reducing stage can reduce the sodium chloride concentration of the water to be treated and collect such species in a concentrated byproduct stream which would typically be discharged as a sodium chloride rich waste stream. This byproduct stream can be utilized to regenerate the cation exchange media in the divalent-reducing stage. The final stage can be considered as a polishing stage that further reduces the concentration of any undesirable species and renders the water as potable. The byproduct stream from this stage can be reintroduced or mixed with water to be treated or discharged. Thus, the illustrated embodiment can advantageously reduce the overall discharge burden. In some instances, it would be impractical to utilize such a concentrate stream to regenerate the divalent removal stage, but because the monovalent selective devices typically operate at an elevated concentration, the possibility of efficient regeneration of ion exchangers becomes possible. Also possible is the production of acid, caustic, and chlorine, for cleaning, sanitization, disinfection, and for aid to regeneration of specially selective ion exchangers such as boron selective ion exchange media.

The product water from the monoselective membrane device may be used for certain purposes directly without need for further treatment, such as for water for agriculture use that beneficially maintains a certain level of divalent ions relative to monovalent ions. Alternately, product water from the second stage may be used directly, for example, where the product water is about 90% desalted and where the water is free or has a reduced level of trace elements and divalent species. Alternately however, the product from the second stage can be sent to a third membrane separation device comprising, for example, non-selective ED or EDI membranes, where in the water is further desalted to high levels of purity. In such a case, the concentrate solution from the third stage typically contains essentially only one type of monovalent ions and thus there is low potential for the third stage to scale or foul, and, the concentrate, at high recovery can be recycled, at, for example, a concentration similar to the source water, to feed the concentrate stream of the first stage of the monovalent selective device. The end result is an overall process that can provide various types of waters for different end uses, while the system is operated under highly efficient conditions that are not prone to fouling or scaling, where the water recovery is much higher than traditional desalination techniques, and where the needed ancillary chemicals for regeneration, for removal of trace elements, for disinfection, for pH adjustment, and for cleaning are provided from the ionic makeup of the source water.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of reducing total dissolved solids in seawater comprising:
    reducing a concentration of dissolved solids in the seawater in a nanofiltration device to produce a first partially treated water;
    reducing a concentration of dissolved solids in the first partially treated water in an electrodialysis device to produce a second partially treated water; and
    reducing a concentration of dissolved solids in the second partially treated water in an electrodeionization device to produce treated water having less than about 1,000 ppm total dissolved solids and a boron content of less than about 0.5 ppm,
    wherein energy consumption to produce the treated water through the nanofiltration device, the electrodialysis device, and the electrodeionization device is less than about 7 kwh/kgal.

2. The method of claim 1 wherein the nanofiltration device is operated at an upstream pressure of less than about 600 psi.

3. The method of claim 1 wherein the treated water comprises less than about 500 ppm total dissolved solids.

4. The method of claim 1, further comprising mixing a concentrate stream from the electrodeionization device with the seawater upstream of the nanofiltration device.

5. The method of claim 1, wherein reducing the concentration of dissolved solids from the first partially treated water comprises producing the second partially treated water from an electrodialysis device having monovalent selective membranes.

6. The method of claim 1, wherein reducing the concentration of dissolved solids in the seawater in a nanofiltration device comprises reducing a concentration of monovalent species in the seawater stream to produce the first partially treated water product.

7. The method of claim 1, wherein the treated water has more than about 230 ppm total dissolved solids.

* * * * *